United States Patent

Inoue

[19]

[11] 4,346,334
[45] Aug. 24, 1982

[54] DC SERVOMOTOR SYSTEM
[75] Inventor: Toyokazu Inoue, Nagoya, Japan
[73] Assignee: Brother Kogyo Kabushiki Kaisha, Nagoya, Japan
[21] Appl. No.: 284,803
[22] Filed: Jul. 20, 1981
[30] Foreign Application Priority Data Jul. 23, 1980 [JP] Japan .................................. 55-100823
Jul. 24, 1980 [JP] Japan .................................. 55-101709

[51] Int. Cl.$^3$ ............................................... G05B 1/06
[52] U.S. Cl. .................................. 318/45; 112/121.12; 318/85; 318/654
[58] Field of Search ............... 318/654, 655, 659, 660, 318/661, 45, 85, 675; 112/121.12

[56] References Cited
U.S. PATENT DOCUMENTS

| | | | |
|---|---|---|---|
| 3,030,564 | 4/1962 | Early et al. ............................ | 318/45 |
| 3,991,350 | 11/1976 | Miyagoshi ............................. | 318/85 |
| 4,000,449 | 12/1976 | Gripp ..................................... | 318/85 X |
| 4,093,904 | 6/1978 | Burig et al. ............................ | 318/85 X |
| 4,152,994 | 5/1979 | Sugiyama ............................... | 318/45 |

Primary Examiner—B. Dobeck
Attorney, Agent, or Firm—Browdy and Neimark

[57] ABSTRACT

An automatic motion or position control DC servomotor system in which a load-driving axis driven by a DC motor to be controlled in one rotary mechanism is rotated synchronously with, or following the rotation of, a reference axis manually operated or driven by another DC motor. The system comprises a position signal generator producing first sine- and cosine-wave signals corresponding to an angle of rotation of the controlled load-driving axis; a command signal generator producing second sine- and cosine-wave signals corresponding to an angle of rotation of the reference axis; an arithmetic unit processing the first and second sine- and cosine-wave signals and providing a sine-wave feedback voltage output signal; and a driver circuit amplifying the feedback voltage signal and providing a thus amplified signal to the DC motor driving the load-driving axis. When the reference axis is driven by another DC motor, the command signal generator may be a second position signal generator. The command signal and position signal generators each consists of a combination which preferably comprises a sine-cosine potentiometer. The DC servomotor system is suitably applicable to a sewing machine in such manner that the rotating hook shaft is driven by a first DC motor and the arm shaft by a second DC motor, the first DC motor being controlled synchronously with the second one under closed-loop feedback control as stated above.

6 Claims, 8 Drawing Figures

DC SERVOMOTOR SYSTEM

BACKGROUND OF THE INVENTION

The present invention relates to a direct current servomotor.

In an automatic motion or position control system, for example, wherein a shaft to be endlessly controlled in one rotary mechanism is rotated synchronously with the rotation of a reference shaft in another rotary mechanism, there is generally provided a position detecting device which detects an angular position of the reference shaft and produces a position signal related to a detected angular position of the reference shaft in order to control the angular position of that shaft which is to be controlled. As a position detector for use in such automatic motion control system, synchros (synchronous devices) such as ones commonly referred to as "selsyns", DC synchros, and optical incremental encoders have been comparatively in wide use. Where a motion control system uses a synchro, however, it has been recognized that there is an inconvenience or disadvantage that a synchro transmitter or generator is subjected to unfavorable reverse transmission of power due to reaction of torque at a synchro receiver. Another recognized disadvantage of using a synchro which is, by nature, constructed and assembled to extremely high accuracy, is its difficulty in disassembling and resassembling thereof for repair purposes. In the case where a rotor shaft of a synchro receiver is used directly as a torque delivering shaft which is to be controlled, a torque to be delivered by the controlled shaft is comparatively small with respect to the weight of the synchro receiver. This is a further disadvantage arising from the use of a synchro.

When an automatic motion control system uses a DC synchro in which a rotor of a synchro receiver, consisting of a permanent magnet, i.e., a shaft to be controlled, is rotated one full turn in response to one-rotation variation in command signals produced corresponding to angular position of a reference shaft of a synchro transmitter, the rotor is limited to one of double-pole type and thus its torque delivery tends to be small. Solving this disadvantage of the DC synchro requires additional provision of a closed-loop feedback device in the motion control system in question.

When an optical incremental encoder is used as a position detector, there also arise various problems. These problems are due to possible errors in conversion of rotating angle of a reference shaft into pulse trains. In more detail, such encoder has a disadvantage that a shaft to be controlled suffers a hunting over an angular range equivalent to at least one pulse when the shaft is being stopped or rotating at a low speed because it is impossible to check whether or not a reference shaft is rotating while a pulse from the encoder is not present. Further, it has been found that even when the encoder is given an increased number of divisions to overcome the above hunting problem the response speed of an optical detector element of the encoder is limited and therefore the upper limit of the rotating speed of the reference shaft must be held at a low level whereby the encoder is extremely limited in its application. Thus, it has been difficult to have an optical incremental encoder as a position detector which has an enhanced response capability.

In a common, electrically-powered sewing machine, a single motor is generally employed to rotate a needle bar driving arm shaft as well as a rotating hook driving shaft. This arrangement of driving system, however, may have inaccurate synchronization of the arm shaft with the rotating hook shaft due to twisting and distorsion of those shafts especially where the arm and the shafts have a considerable length as on large-sized sewing machines, particularly for industrial application. Such large-sized machines, therefore, require extremely solid or sturdy construction of such shafts and power transmission connecting therebetween. To solve this problem, it has been attempted to provide an automatic motion control system wherein an arm shaft and an rotating hook shaft are powered by separate, respective motors and the rotation of the rotating hook shaft driving motor is controlled in endless synchronization with the rotation of the arm shaft driving motor. Such automatic motion control system requires use of a position detector which detects angular position of the arm shaft driving motor. While the previously introduced synchros such as selsyns, DC synchros, optical incremental encoders, and other position detectors have been considered to be applicable to such need, they have the disadvantages as indicated above.

SUMMARY OF THE INVENTION

The present invention was made to provide solutions to the above described problems. It is accordingly the primary object of this invention to provide a DC servomotor system which is free of hunting trouble conventionally encountered when motors are stopped or while they are being rotated at a low speed.

It is another object of this invention to provide a DC servomotor system which is capable of high-speed response.

It is another object of this invention to provide a DC servomotor system which is capable of delivering a greater torque.

It is further object of this invention to provide a DC servomotor system which is capable of attaining the above objects by a simple structure.

According to this invention there is provided a DC servomotor system comprising (a) a direct current motor, (b) first signal generating means for producing, in response to rotary movement of the direct current motor, a first sine-wave signal A·SIN x and a first cosine-wave signal B·COS x, where x is an angle of rotation of the direct current motor, and A and B are constants, (c) second signal generating means for producing a second sine-wave signal C·SIN y and a second cosine-wave signal D·COS y, where y is a variable and C and D are constants, (d) arithmetic means for processing the first sine- and cosine-wave signals A·SIN x and B·COS x and the second sine- and cosine-wave signals C·SIN y and D·COS y to produce a sine-wave signal E·SIN (y−x), where E is a constant, and (e) means for amplifying the sine-wave signal E·SIN (y−x) and providing a thus amplified sine-wave signal E·SIN (y−x) to the direct current motor, whereby the direct current motor is rotated in accordance with the signals produced from the second signal generating means.

The first signal generating means preferably consists of a position signal generating unit connected to the rotary shaft of the direct current motor and the second signal generating means preferably includes a rotatable shaft manually operated or driven by a rotary mechanism. The rotary mechanism may be another direct current motor.

A sine-cosine potentiometer, which comprises a casing, a rotatable shaft, a carbon film coated on the internal surface of the casing with so purposely defined development, and a pair of sliding contacts fixed to the rotatable shaft for sliding over the carbon film, is one of most suitable devices for generating the sine- and cosine-wave signals.

A DC servomotor system constructed as stated above may permit a DC motor to provide a large torque, may prevent hunting trouble which otherwise take place when the motors are stopped or rotated at a low speed, and may have an increased response speed. Another advantage of the DC servomotor system of the invention is that it requires no complicated procedures of disassembling and re-assembling thereof for repair purpose. This ease of repairing is contrary to a conventional system using a synchro which requires the use of accurately assembled parts and thus needs complicated repairing procedures. The DC servomotor system of the invention offers a still further advantage that it never suffers a trouble of reverse power transmission due to reaction of torque which causes an inconvenience in controlling the system.

Particularly, an invented DC servomotor system wherein a first DC motor and a second DC motor are rotated synchronously with each other is suitably applicable to a sewing machine in such manner that the rotating hook shaft is driven by the first DC motor and the arm shaft by the second DC motor. The rotating hook shaft is controlled synchronously with the arm shaft under closed loop feedback control.

DETAILED DESCRIPTION OF THE PREFERRED EMBODIMENT

Figure 1:
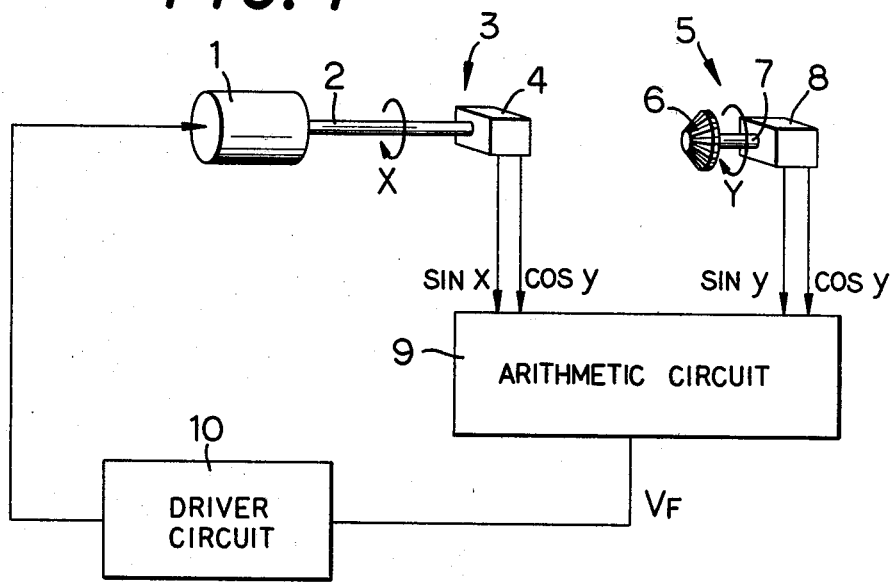
FIG. 1 is an illustrative schematic circuit diagram of an embodiment of an automatic motion control system in accordance with the present invention.
Figure 2:
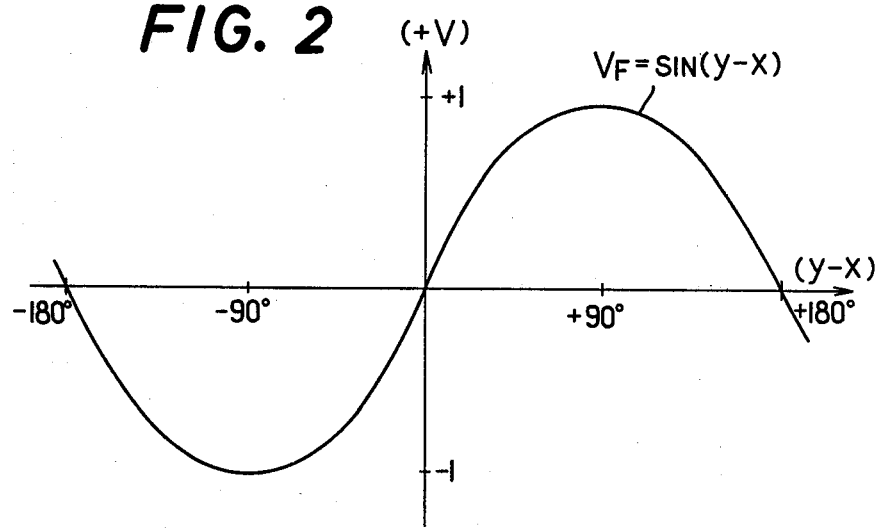
FIG. 2 is a graphic representation of an output waveform of an arithmetic circuit used in the above embodiment.

Referring now to the figures of accompanying drawing, the preferred embodiments of the present invention are described below. In FIG. 1, there is shown a DC motor 1 by which is rotated a load-driving shaft 2 which is an axis to be controlled. A position signal generator 3, which is provided for detecting an angular position of the DC motor 1 or more particularly of the driving shaft 2, comprises a sine-cosine potentiometer 4 which is coupled with the driving shaft 2. The position signal generator 3 produces, in response to rotation of the DC motor 1, a first sine-wave signal $A \cdot SIN\ x$ and a first cosine-wave signal $B \cdot COS\ x$, each being generated by the sine-cosine potentiometer 4, where x is an angle of rotation of the driving shaft 2 as measured from its reference position and A and B are constants, which are herein set as $A = B = 1$ for illustrative purpose. On the other hand, a command signal generator 5 comprises a rotatable shaft 7 which is manually operated by a control knob 6, and further comprises a sine-cosine potentiometer 8 which, in response to rotation of the manually rotatable shaft 7, produces a second sine-wave signal $C \cdot SIN\ y$ and a second cosine-wave signal $D \cdot COS\ y$, where y is an angle of rotation as measured from a reference position of the rotatable shaft 7 by which the corresponding angle is commanded, and C and D are constants, which are also set as $C = D = 1$ for illustrative purpose in this description. The sine-cosine potentiometers 4 and 8 are identical in construction in which one rotation of the shaft results in the generation of a sine-wave and a cosine-wave signal in one cycle. The relationship in phase between the two potentiometers 4 and 8 is set such that when command signals SIN 0 and COS 0 are successively produced by the command signal generator 5, the driving shaft 2 which rotates with the DC motor 1 is held at its reference angular position (i.e., $x = 0$) and position signals being generated by the position signal generator 3 are also SIN 0 and COS 0. An arithmetic circuit 9 is provided, which receives the outputs from the position signal generator 3 and the command signal generator 5, and provides an output of feedback voltage $V_F$ after an arithmetic operation. In more detail, the arithmetic circuit 9 processes the first and second sine-wave signals SIN x and SIN y, and the first and second cosine-wave signals COS x and COS y so as to solve the equation "$SIN\ (y-x) = SIN\ y \cdot COS\ x - SIN\ x \cdot COS\ y$", and outputs a resultant sine-wave signal as a feedback voltage $V_F$. This feedback voltage $V_F$ signal has a waveform as shown in FIG. 2. The feedback voltage $V_F$ is amplified by a driver circuit 10 which furnishes the amplified output to the DC motor 1 to drive the same. In this connection, the angles of rotation "x" and "y" are determined, in this specific embodiment, to be positive when the driving shaft 2 and the rotatable shaft 7 are rotated in the directions indicated in FIG. 1 by arrows X and Y, respectively.

Figure 3:
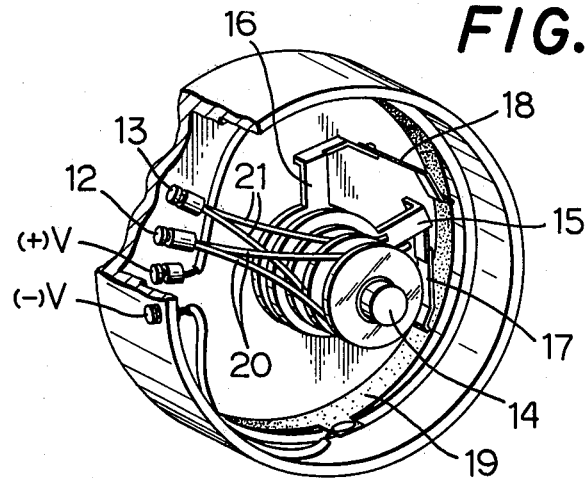
FIG. 3 is a perspective view of a typical potentiometer used in the automatic motion control system.
Figure 4:
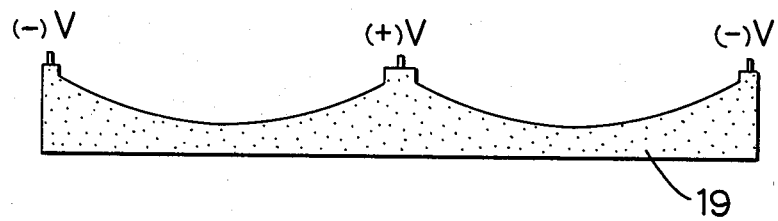
FIG. 4 is a development of a carbon film on the inner surface of a casing of the potentiometer.

There is provided below a detailed description of the sine-cosine potentiometers 4 and 8 having the similar construction, and of the arithmetic circuit 9. Referring to FIGS. 3 and 4 illustrating the construction of the potentiometers, each potentiometer is equipped, on the periphery of a casing 11 of resin material, with a positive power terminal $(+)V$, a negative power terminal $(-)V$ whose absolute voltage is equal to that of the terminal $(+)V$, a sine-wave terminal 12 from which a sine-wave signal is delivered, and a cosine-wave terminal 13 from which a cosine-wave signal is delivered. On the bottom of the casing 11, is rotatably supported a shaft 14 which is equivalent to the previous driving shaft 2 or rotatable shaft 7. The shaft 14 has mutually, electrically-insulated arms 15 and 16 mounted thereon, which are disposed at a right angle (90°) to each other. To the end of both arms 15 and 16, are attached contacts 17 and 18 which slide, with a 90°-spacing from each other, on a carbon film 19 coated on the inner surface of the casing 11. Resilient rods 20 and 21 extend from the sine-wave and cosine-wave terminals 12 and 13, respectively, so that the terminals are electrically connected, with the respective rods 20 and 21, to the arms 15 and 16, respectively, even when the shaft 14 is rotated. As shown in FIG. 4, the envelope of the carbon film 19 has such configuration as to allow the sine-wave and cosine-wave terminals 12 and 13 to generate respective sine-wave and cosine-wave voltage signals varying across the zero level in response to the rotation of the shaft 14. It is noted that FIG. 3 shows the potentiometer with its cap removed for the purpose of illustrating the internal structure thereof.

Figure 5:
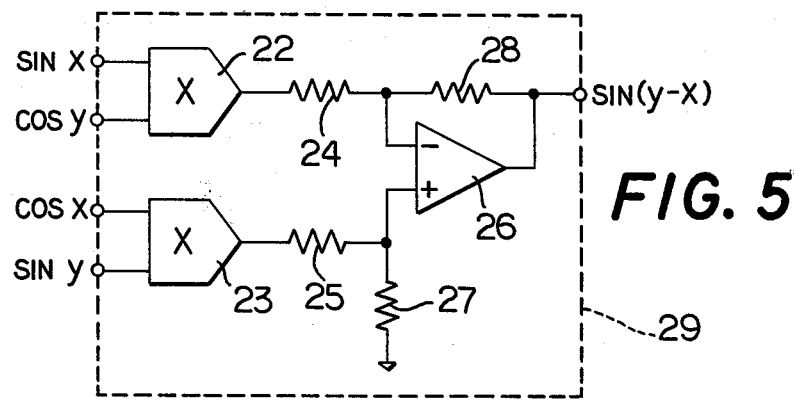
FIG. 5 is a detailed diagram of the arithmetic circuit.

Referring now to FIG. 5, the arithmetic circuit 9 is described. The first sine-wave signal SIN x and the second cosine-wave signal COS y are connected to input terminals of a multiplier circuit 22, and the first cosine-wave signal COS x and the second sine-wave signal SIN y are connected to input terminals of another multiplier circuit 23. The outputs of the multiplier circuits 22 and 23, i.e., SIN x·COS y and COS x·SIN y are connected, via respective resistors 24 and 25, to negative and positive input terminals of an arithmetic amplifier circuit 26, respectively, which circuit 26 performs a subtraction between the two input values and provides a signal SIN (y−x), i.e., a feedback voltage $V_F$. A resistor 27 is connected between the positive input terminal of the arithmetic amplifier circuit 26 and the ground, and a resistor 28 between the negative input terminal and the output terminal of the circuit 26. Each of the resistors 24, 25, 27 and 28 has a resistance of 10 KΩ.

In the above arrangement, as soon as the rotatable shaft 7 has been rotated in the direction of arrow Y with the control knob 6 the value "y" has become greater than the value "x" (Y>x) and a second sine-wave signal SIN y and a second cosine-wave signal COS y corresponding to the angle of rotation of the rotatable shaft 7 have been produced as command signals by the sine-cosine potentiometer 8. Then, the arithmetic circuit 9 provides a feedback output voltage $V_F$ based upon the above command signals SIN y and COS y, and upon position signals SIN x and COS x from the position signal generator 3. Since the value "y" is greater than the value "x" (y>x), that is, y−x>0 at this time, the produced feedback voltage $V_F$ is positive as illustrated in FIG. 2, and thus this voltage $V_F$ applied to the DC motor 1 through the driver circuit 10 causes the driving shaft 2 to rotate in the direction of arrow X until the equation "y−x=0" is satisfied. If, on the contrary, the rotatable shaft 7 is rotated in the direction opposite to that indicated by arrow Y, then the value "y" becomes smaller than the value "x" (y<x), that is, y−x<0, and the driving shaft is rotated in the reversed X direction until the equation "y−x=0" is satisfied.

As described above, the driving shaft 2 is rotated following the rotation of the rotatable shaft 7. The following rotation is warranted within a range of −180°<y−x<+180°. Thus, the system has a sufficient feedback capability to compensate for error or difference between commanded and actual angular positions due to external factors caused, for example, when the driving shaft 2 is connected to a heavy work load. Since the $V_F$ curve is steep especially in the area where the "y−x" value (voltage $V_F$) is near the zero level and the DC motor 1 may have an arbitrarily selected number of poles, the DC motor 1 may well be expected to deliver a sufficient output torque. In addition, if the above arrangement uses an arithmetic circuit 9 which consists of an analog arithmetic unit, it is possible to provide an automatic motion control system which not only has a highly increased speed of computing the feedback voltage $V_F$, a resolution that may be minimized to infinity, and a sufficiently improved response capability, but also is free of hunting troubles of the DC motor 1 when it is stopped or rotated at a low speed.

While the command signal generator 5 in the above embodiment consists of the manually rotatable shaft 7 and the sine-cosine potentiometer 8 which produces command signals SIN y and COS y corresponding to an angle of rotation of the rotatable shaft 7 as measured from its reference angular position, the generator 5 is not limited to this specific combination. For example, the generator 5 may be replaced by a microcomputer with a CPU which is loaded with a program to provide a second sine-wave signal SIN y and a second cosine-wave signal COS y. Also, it is possible in the above embodiment or in the alternative embodiment that a plurality of DC motors are controlled by means of a command signal generator.

Figure 6:
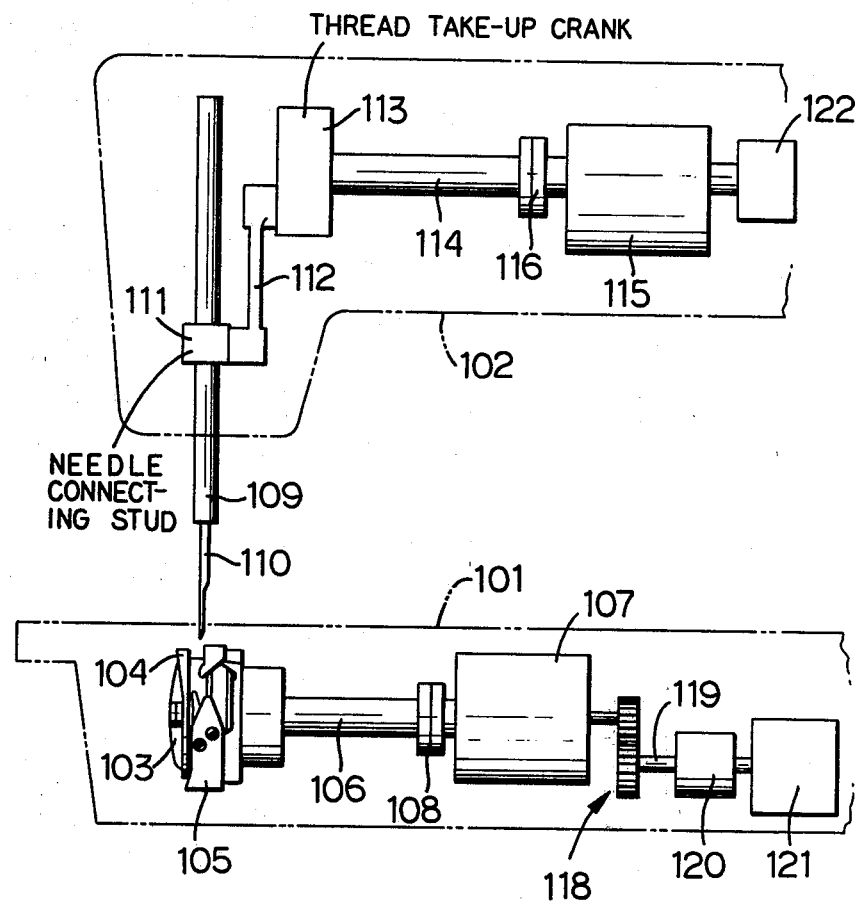
FIG. 6 is a schematic representation of a sewing machine in which another embodiment of this invention is incorporated.

Referring to FIG. 6, another embodiment of the invention adapted to be used on a sewing machine is described below.

There are illustrated in FIG. 6; a machine bed 101, an arm 102, a shuttle bobbin case 103, a shuttle body 104, a rotating hook 105, and a rotating hook shaft 106 one end of which is connected to the rotating hook 105. A first DC motor 107 is connected via a coupling 108 to the other end of the rotating hook shaft 106 to drive the rotating hook 105. Also shown in the figure are; a needle bar 109, a needle 110 fixed to the bar 109, a needle bar connecting stud 111, a needle bar crank rod 112, a thread take-up crank 113, and an arm shaft 114 one end of which is connected to the thread take-up crank 113. A second DC motor 115 is connected via a coupling 116 to the other end of the arm shaft 114.

Figure 7:
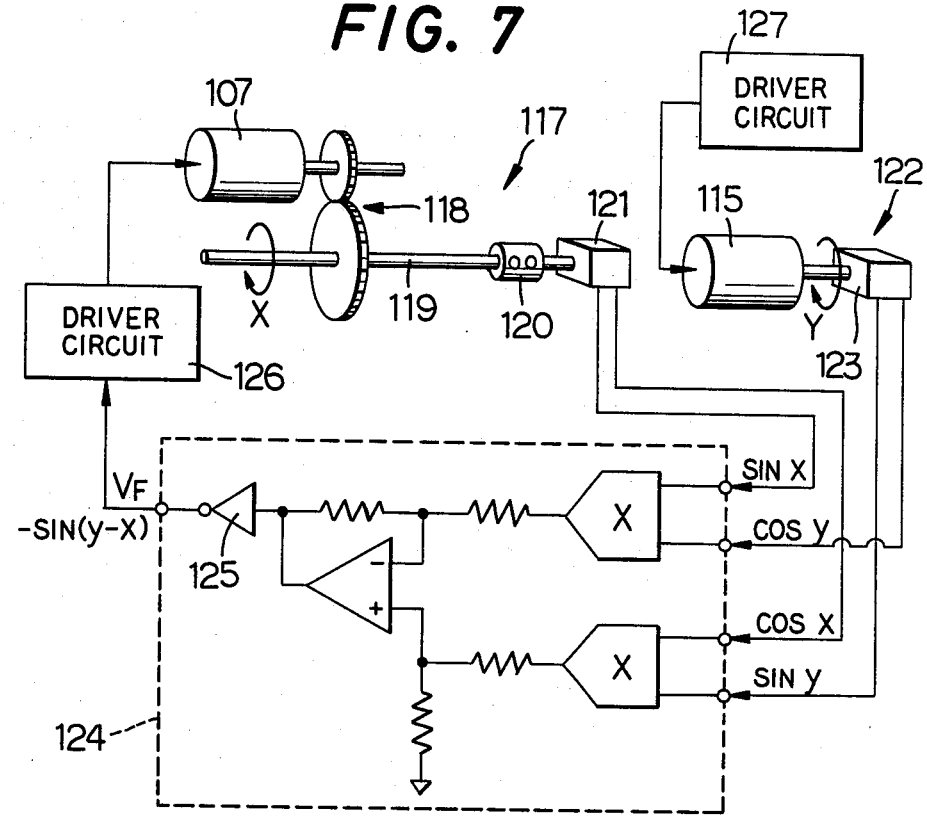
FIG. 7 is an illustrative schematic circuit diagram of said another embodiment of an automatic motion control system.
Figure 8:
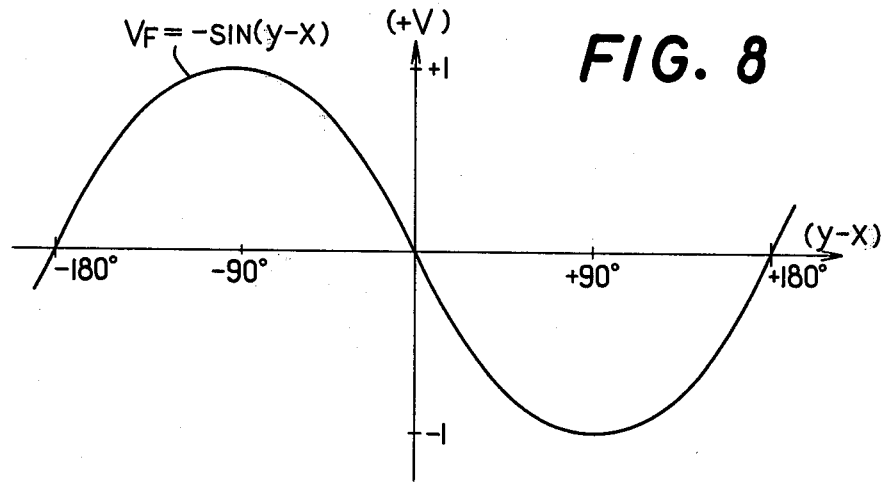
FIG. 8 is a graphic representation of an output waveform of an arithmetic circuit used in said another embodiment.

In FIG. 7, is shown a first position signal generator 117 which detects angular position of the first DC motor 107, and more particularly angular position of the rotating hook shaft 106. The first position signal generator 117 comprises a detector shaft 119 which is rotated by the first DC motor 107 through a pair of reduction gears 118 having a 2-to-1 speed reduction ratio, and further comprises a sine-cosine potentiometer 121 which is connected via a coupling 120 to the detector shaft 119. The reduction gears 118 constitute a speed reducer that permits the rotating hook to rotate twice per one oscillation of the needle 110. The sine-cosine potentiometer 121 of the first position signal generator 117 produces, in response to rotation of the first DC motor 107, a first sine-wave signal A·SIN x and a first cosine-wave signal B·COS x, where x is an angle of rotation of the detector shaft 119 as measured from its reference angular position, and A and B are constants, which are herein set as A=B=1 for illustrative purpose as in the previous embodiment. On the other hand, a second position signal generator 122 detects angular position of the second DC motor 115, and more particularly angular position of the arm shaft 114. The second position signal generator 122 includes a sine-cosine potentiometer 123 which is rotated directly by the second DC motor 115 and produces, in response to rotation of the motor 115, a second sine-wave signal C·SIN y and a second cosine-wave signal D·COS y, where y is an angle of rotation of the arm shaft 114 as measured from its reference angular position, and C and D are constants, which are also set as C=D=1 for illustrative purpose in this description. For the sewing machine to operate properly, the first DC motor 107 to drive the rotating hook 105 and the second DC motor 115 to drive the needle 110 must operate synchronously with each other so that the rotating hook 105 and the needle 110 may cooperate in the most suitable timing. Assuming that the sine-cosine potentiometer 123 of the second position signal generator 122 is placed at its reference position (that is, the position where y=0) when the needle 110 is located at a specified position along its vertical path, the most suitable position of the rotating hook 105 with respect to that specific position of the needle 110 is automatically determined, and the position of the sine-cosine potentiometer 121 of the first position signal generator 117 which corresponds to the most suitable position of the rotating hook 105 may be determined to be the reference position of the potentiometer 121 (that is, the position where x=0). An arithmetic circuit 124 receives and processes outputs from the first and second position signal generators 117 and 122, and provides a feedback voltage output $V_F$. In more detail, the arithmetic circuit 124 processes the first and second sine-wave signals SIN x and SIN y, and the first and second cosine-wave signals COS x and COS y so as to solve the equation "SIN $x$·COS $y$−SIN $y$·COS $x$=−SIN $(y−x)$", and outputs a resultant sine-wave signal as a feedback voltage $V_F$. This feedback voltage signal $V_F$ has a waveform as shown in FIG. 8. As understood from the above description and FIG. 8, the arithmetic circuit 124 of this embodiment is additionally provided at its output portion with an inverter 125 to invert the output from the arithmetic circuit 9 of the previous embodiment. The feedback voltage $V_F$ is amplified by a driver circuit 126 which furnishes the amplified output to the first DC motor 107 to drive the same. Numeral 127 represents a driver circuit for the second DC motor 115. In this connection, the angles of rotation "x" and "y" are determined, in this specific embodiment, to be positive when the arm shaft 114 and the detector shaft 119 are rotated in the directions indicated in FIG. 7 by arrows X and Y. The construction of the sine-cosine potentiometers 121 and 123 is similar to that of the potentiometers 4 and 8 shown in FIGS. 3 and 4.

In the above arrangement, as soon as the arm shaft 114 has been rotated in the direction of arrow Y by the second DC motor 115 with drive commands from the driver circuit 127, the value "y" has become greater than the value "x" (y>x) and second sine-wave and cosine-wave signals SIN y and COS y corresponding to the angle of rotation of the arm shaft 114 have been produced as command signals by the sine-cosine potentiometer 123. Then, the arithmetic circuit 124 provides a feedback output voltage $V_F$ based upon the above command signals SIN y and COS y, and position signals SIN x and COS x from the first position signal generator 117. Since the value "y" is greater than the value "x" (y>x), that is, y−x>0 at this time, the produced feedback voltage $V_F$ is negative as illustrated in FIG. 8, and thus this voltage $V_F$ applied to the first DC motor 107 via the driver circuit 126 will cause the rotating hook shaft 106 to rotate in the direction opposite to that indicated by arrow X until the value "y" has become equal to the value "x" (until the equation "y−x=0" is satisfied). Repetition of the above operation enables the rotating hook shaft 106 to rotate synchronously with or following the arm shaft 114. It is noted that, since the detector shaft 119 and the rotating hook shaft 106 are so arranged that the angle of rotation of the former is "x" while that of the latter is "2x", the latter shaft 106 is consequently rotated at a speed two times as high as a speed at which the arm shaft 114 is rotated. While the shaft 106 of the first DC motor 107 and the detector shaft 119 are rotated in opposite directions due to the use of the pair of reduction gears 118 in this embodiment and as a result the output $V_F$ from the arithmetic circuit 124 is −SIN (y−x), that is, $V_F$=−SIN $(y−x)$, it is needless to point out that the feedback output $V_F$ must be SIN (y−x), that is, $V_F$=SIN $(y−x)$ where both shafts 106 and 119 are rotated in the same direction. It is also noted that if the value "y" is not identical to the value "x" when power is initially applied to the sewing machine, the rotating hook shaft 106 is rotated also in the above indicated manner until the value "y" has become equal to the value "x" prior to subsequent normal rotation of the same synchronous with the arm shaft.

It is to be understood by those skilled in the art that an automatic motion control or DC servomotor system of the present invention is not limited in its application to sewing machines and may be adapted to use in other equipment.

What is claimed is:

1. A DC servomotor system comprising:
   (a) a direct current motor;
   (b) first signal generating means for producing, in response to rotary movement of said direct current motor, a first sine-wave signal A·SIN x and a first cosine-wave signal B·COS x, where x is an angle of rotation of said direct current motor, and A and B are constants;
   (c) second signal generating means for producing a second sine-wave signal C·SIN y and a second cosine-wave signal D·COS y, where y is a variable and C and D are constants;
   (d) arithmetic means for processing said first sine- and cosine-wave signals A·SIN x and B·COS x and said second sine- and cosine-wave signals C·SIN y and D·COS y to produce a sine-wave signal E·SIN (y−x), where E is a constant; and
   (e) means for amplifying said sine-wave signal E·SIN (y−x) and providing a thus amplified sine-wave signal E·SIN (y−x) to said direct current motor, whereby said direct current motor is rotated in accordance with the signals produced from said second signal generating means.

2. A DC servomotor system comprising:
   (a) a direct current motor;
   (b) a position signal generating unit connected to said direct current motor for producing, in response to rotary movement of said direct current motor, a first sine-wave signal A·SIN x and a first cosine-wave signal B·COS x, where x is an angle of rotation of said direct current motor as measured from a reference angular position thereof, and A and B are constants;
   (c) a command signal generating unit which produces a second sine-wave signal C·SIN y and a second cosine-wave signal D·COS y, where y is an angle of rotation of said command signal generating unit as measured from a reference angular position thereof, and C and D are constants;
   (d) an arithmetic circuit connected to said position signal generating unit and said command signal generating unit for receiving, as inputs thereto, said first sine- and cosine-wave signals A·SIN x and B·COS x and said second sine- and cosine-wave signals C·SIN y and D·COS y and producing, as an output therefrom, a sine-wave signal E·SIN (y−x), where E is a constant; and
   (e) a driver circuit connected to said arithmetic circuit for amplifying said sine-wave signal E·SIN (y−x) and providing a thus amplified sine-wave signal E·SIN (y−x) to said direct current motor, whereby said direct current motor is rotated in accordance with the signals produced from said command signal generating unit.

3. A DC servomotor system according to claim 2 wherein said command signal generating unit includes a manually controlled rotatable shaft and means for producing said second sine- and cosine-wave signals C·SIN y and D·COS y corresponding to an angle of rotation of said rotatable shaft.

4. A DC servomotor system according to claim 3 wherein said position signal generating unit and said command signal generating unit each includes a sine-cosine potentiometer.

5. A DC servomotor system comprising:
(a) a first direct current motor;
(b) a first position signal generating unit connected to said first direct current motor for producing, in response to rotary movement of said first direct current motor, a first sine-wave signal A·SIN x and a first cosine-wave signal B·COS x, where x is an angle of rotation of said first direct current motor as measured from a reference angular position thereof, and A and B are constants;
(c) a second direct current motor;
(d) a second position signal generating unit connected to said second direct current motor for producing, in response to rotary movement of said second direct current motor, a second sine-wave signal C·SIN y and a second cosine-wave signal D·COS y, where y is an angle of rotation of said second direct current motor as measured from a reference angular position thereof, and C and D are constants;
(e) an arithmetic circuit connected to said first and second position signal generating units for receiving, as inputs thereto, said first sine- and cosine-wave signals A·SIN x and B·COS x and said second sine- and cosine-wave signals C·SIN y and D·COS y, and producing as an output therefrom, a sine-wave signal E·SIN (y−x), where E is a constant; and
(f) a driver circuit connected to said arithmetic circuit for amplifying said sine-wave signal E·SIN (y−x) and providing a thus amplified sine-wave signal E·SIN (y−x) to said first direct current motor, whereby said first direct current motor is rotated following rotation of said second direct current motor.

6. A DC servomotor system according to claim 5 wherein said first direct current motor is connected to and drives a rotating hook shaft of a sewing machine and said second direct current motor is connected to and drives an arm shaft of same.

* * * * *